US012636962B2

(12) United States Patent
     Link et al.

(10) Patent No.: US 12,636,962 B2
(45) Date of Patent:      May 26, 2026

(54) ELECTRIC VEHICLE BATTERY ARMOR ADJUSTABLE TO OFFROAD DRIVING SITUATIONS AND BATTERY STATES

(71) Applicants: Hyundai Motor Company, Seoul (KR); Kia Corporation, Seoul (KR)

(72) Inventors: Brian Link, Webster Township, MI (US); Yue Ming Chen, Ypsilanti, MI (US); John Harber, Plymouth, MI (US); Shihong Fan, Ann Arbor, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 320 days.

(21) Appl. No.: 18/418,860

(22) Filed: Jan. 22, 2024

(65) Prior Publication Data

US 2025/0236182 A1      Jul. 24, 2025

(51) Int. Cl.
     B60L 50/64       (2019.01)
     B60R 1/22        (2022.01)
     H01M 50/24       (2021.01)
     H01M 50/242      (2021.01)
     H01M 50/249      (2021.01)

(52) U.S. Cl.
     CPC ................ B60L 50/64 (2019.02); B60R 1/22 (2022.01); H01M 50/24 (2021.01); H01M 50/242 (2021.01); H01M 50/249 (2021.01); B60R 2300/105 (2013.01); B60R 2300/301 (2013.01); H01M 2200/10 (2013.01); H01M 2220/20 (2013.01)

(58) Field of Classification Search
     CPC ..... B60L 50/64; B60R 1/22; B60R 2300/105; B60R 2300/301; H01M 50/24; H01M 50/242; H01M 50/249; H01M 2200/10; H01M 2220/20
     See application file for complete search history.

(56) References Cited

U.S. PATENT DOCUMENTS

| 5,305,513 | A | * | 4/1994 | Lucid | .................. H01M 50/249 |
| | | | | | 180/68.5 |
| 6,372,378 | B1 | * | 4/2002 | Warner | ............... H01M 10/637 |
| | | | | | 429/96 |

(Continued)

FOREIGN PATENT DOCUMENTS

| CN | 113276654 A | 8/2021 |
| CN | 214313405 U | 9/2021 |

*Primary Examiner* — Jacob B Meyer
(74) *Attorney, Agent, or Firm* — Fox Rothschild LLP

(57)      ABSTRACT

A battery armor system and method of deploying the same are provided. The battery armor system may comprise one or more sensors configured to detect whether one or more conditions within an environment of a vehicle are met, a moveable skid plate, positioned under a vehicle battery, configured to move between a retracted position and a deployed position, and one or more actuators configured to move the moveable skid plate between the retracted position and the deployed position. In the deployed position, an airgap may be formed between the moveable skid plate and the vehicle battery. The one or more actuators may be configured to move the moveable skid plate into the deployed position upon detection that the one or more conditions are met.

20 Claims, 12 Drawing Sheets

(56)                    References Cited

U.S. PATENT DOCUMENTS

| | | | |
|---|---|---|---|
| 8,146,694 B2 * | 4/2012 | Hamidi | B60L 53/80 |
| | | | 180/68.5 |
| 8,286,743 B2 * | 10/2012 | Rawlinson | H01M 50/242 |
| | | | 180/68.5 |
| 9,052,168 B1 * | 6/2015 | Rawlinson | H01M 50/224 |
| 10,189,517 B2 | 1/2019 | Povinelli et al. | |
| 10,347,888 B2 * | 7/2019 | Mastrandrea | B60L 50/66 |
| 10,870,365 B2 * | 12/2020 | Ahrens | B60L 53/80 |
| 12,130,122 B1 * | 10/2024 | Smith | H01M 50/209 |
| 12,351,028 B1 * | 7/2025 | Smith | H01M 50/258 |
| 2020/0152927 A1 | 5/2020 | Sekar et al. | |
| 2022/0409453 A1 | 12/2022 | Nicolao | |
| 2025/0236182 A1 * | 7/2025 | Link | H01M 50/242 |

* cited by examiner

300

318

332

374

398

ELECTRIC VEHICLE BATTERY ARMOR ADJUSTABLE TO OFFROAD DRIVING SITUATIONS AND BATTERY STATES

BACKGROUND

Technical Field

Embodiments of the present disclosure relate to electric vehicle battery armor and, in particular, to electric vehicle battery armor that is adjustable to offroad driving situations and battery states.

Background

Many manufacturers are beginning to consider offroad variants of their battery electric vehicle (BEV) truck & SUV offerings for increased product differentiation. However, offroad driving poses a higher risk for damage to the underbody-mounted high voltage (HV) battery due to the rough surfaces, objects in the path of driving, etc. associated with offroad driving. For example, driving offroad in an electric vehicle (EV) exposes the underbody-mounted HV battery to damage from, e.g., rocks, rough road, debris, etc. HV battery can be protected with armor (e.g., skid plate).

Additional fixed skid plating/armor may provide additional protection for the battery, but at a reduction in all-electric range (AER) due to the aerodynamic impacts. Existing EV battery armor reduces the aerodynamic performance of the EV. Reduced aerodynamic performance reduces the range of the EV.

For at least these reasons, there is a need to both protect an EV HV battery while driving offroad and minimize aerodynamic performance reduction.

SUMMARY

According to an object of the present disclosure, a battery armor system is provided. The battery armor system may comprise one or more sensors configured to detect whether one or more conditions within an environment of a vehicle are met, a moveable skid plate, positioned under a vehicle battery, configured to move between a retracted position and a deployed position, and one or more actuators configured to move the moveable skid plate between the retracted position and the deployed position. In the deployed position, an airgap may be formed between the moveable skid plate and the vehicle battery. The one or more actuators may be configured to move the moveable skid plate into the deployed position upon detection that the one or more conditions are met.

According to an exemplary embodiment, the one or more conditions may comprise one or more conditions selected from the following: debris in a path of the vehicle; an uneven driving surface; an offroad driving surface; a temperature of the battery exceeding a threshold temperature; and a level of damage to one or more components of the battery armor exceeding a threshold level of damage.

According to an exemplary embodiment, the battery armor system may comprise a computing device comprising a processor and a memory.

According to an exemplary embodiment, the memory may comprise instructions that, when executed by the processor, are configured to cause the processor to cause the one or more actuators to move the skid plate.

According to an exemplary embodiment, when the skid plate is in the deployed position, the instructions, when executed by the processor, may be configured to cause the processor to cause the actuators to move the skid plate into the retracted position when the one or more conditions are no longer met.

According to an exemplary embodiment, the one or more actuators may be configured to adjust a deployment angle of the skid plate.

According to an exemplary embodiment, the moveable skid plate may be configured to be flush with an underbody of the vehicle when in the retracted position.

According to an exemplary embodiment, the one or more sensors may comprise one or more sensors selected from the following: one or more cameras; one or more LiDAR sensors; and one or more RADAR sensors.

According to an exemplary embodiment, the battery armor system may comprising the vehicle.

According to an exemplary embodiment, the vehicle may comprise an electric vehicle.

According to an object of the present disclosure, a method of selectively deploying a battery armor system is provided. The method may comprise, using a computing device comprising a processor and a memory, determining, based on data from one or more sensors of a battery armor system, whether one or more conditions are met within an environment of a vehicle. The battery armor system may comprise one or more sensors configured to detect whether the one or more conditions are met, a moveable skid plate, positioned under a vehicle battery, configured to move between a retracted position and a deployed position, and one or more actuators configured to move the moveable skid plate between the retracted position and the deployed position. In the deployed position, an airgap may be formed between the moveable skid plate and the vehicle battery. The one or more actuators may be configured to move the moveable skid plate into the deployed position upon detection that the one or more conditions are met; deploying, using the one or more actuators, the skid plate into the deployed position when the one or more conditions are met. The method may comprise, when the skid plate is in the deployed position, retracting, using the one or more actuators, the skid plate into the retracted position when the one or more conditions are no longer met.

According to an exemplary embodiment, the determining whether the one or more conditions are met may comprise determining whether a level of damage to one or more components of the battery armor system has been exceeded. According to an exemplary embodiment, the one or more conditions may be met when the level of damage to the one or more components of the battery armor system has been exceeded.

According to an exemplary embodiment, the determining whether the one or more conditions are met may comprise determining whether a temperature of the vehicle battery exceeds a threshold temperature. According to an exemplary embodiment, the one or more conditions may be met when the temperature of the vehicle battery exceeds the threshold temperature.

According to an exemplary embodiment, the determining whether the one or more conditions are met may comprise determining whether debris is present within a path of the vehicle. According to an exemplary embodiment, the one or more conditions may be met when the debris is found within the path of the vehicle.

According to an exemplary embodiment, the determining whether the one or more conditions may be met comprises determining whether a driving surface is a rough road driving surface. According to an exemplary embodiment, the one or more conditions may be met when the driving surface is a rough road driving surface.

According to an exemplary embodiment, the determining whether the one or more conditions are met may comprise determining whether a driving surface is an offroad driving surface. According to an exemplary embodiment, the one or more conditions may be met when the driving surface is an offroad driving surface.

According to an exemplary embodiment, the method may comprise adjusting, using the one or more actuators, a deployment angle of the skid plate.

According to an exemplary embodiment, the one or more sensors may comprise one or more sensors selected from the following: one or more cameras; one or more LiDAR sensors; and one or more RADAR sensors.

According to an exemplary embodiment, the battery armor system may comprise the vehicle.

According to an exemplary embodiment, the vehicle may comprise an electric vehicle.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1A:
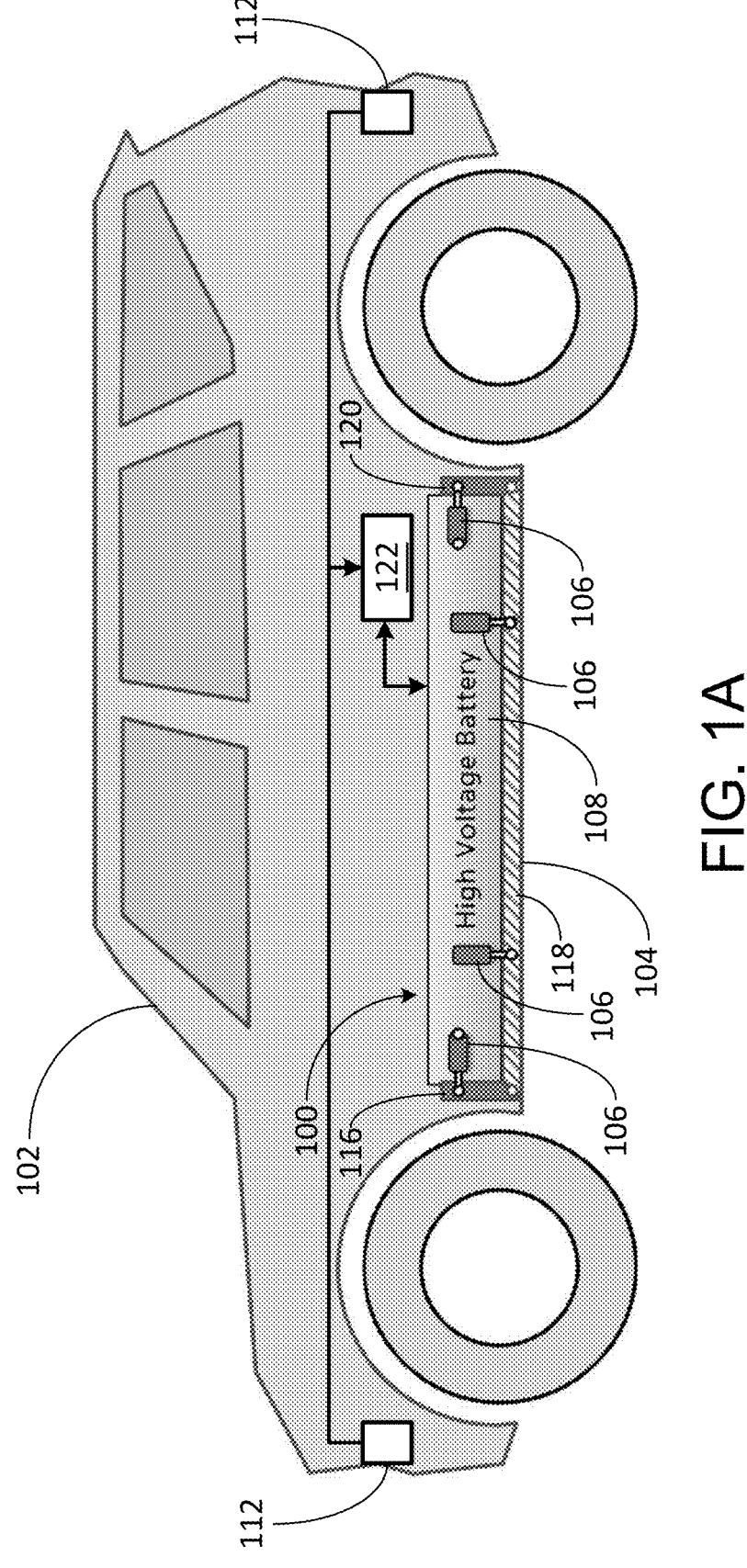
FIG. 1A illustrates a battery armor system, coupled to a vehicle, in a retracted ("OFF") state, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices. e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

According to exemplary embodiments of the present disclosure, electric vehicle (EV) battery armor that is adjustable to offroad driving situations and battery states is illustratively depicted.

Figure 1B:
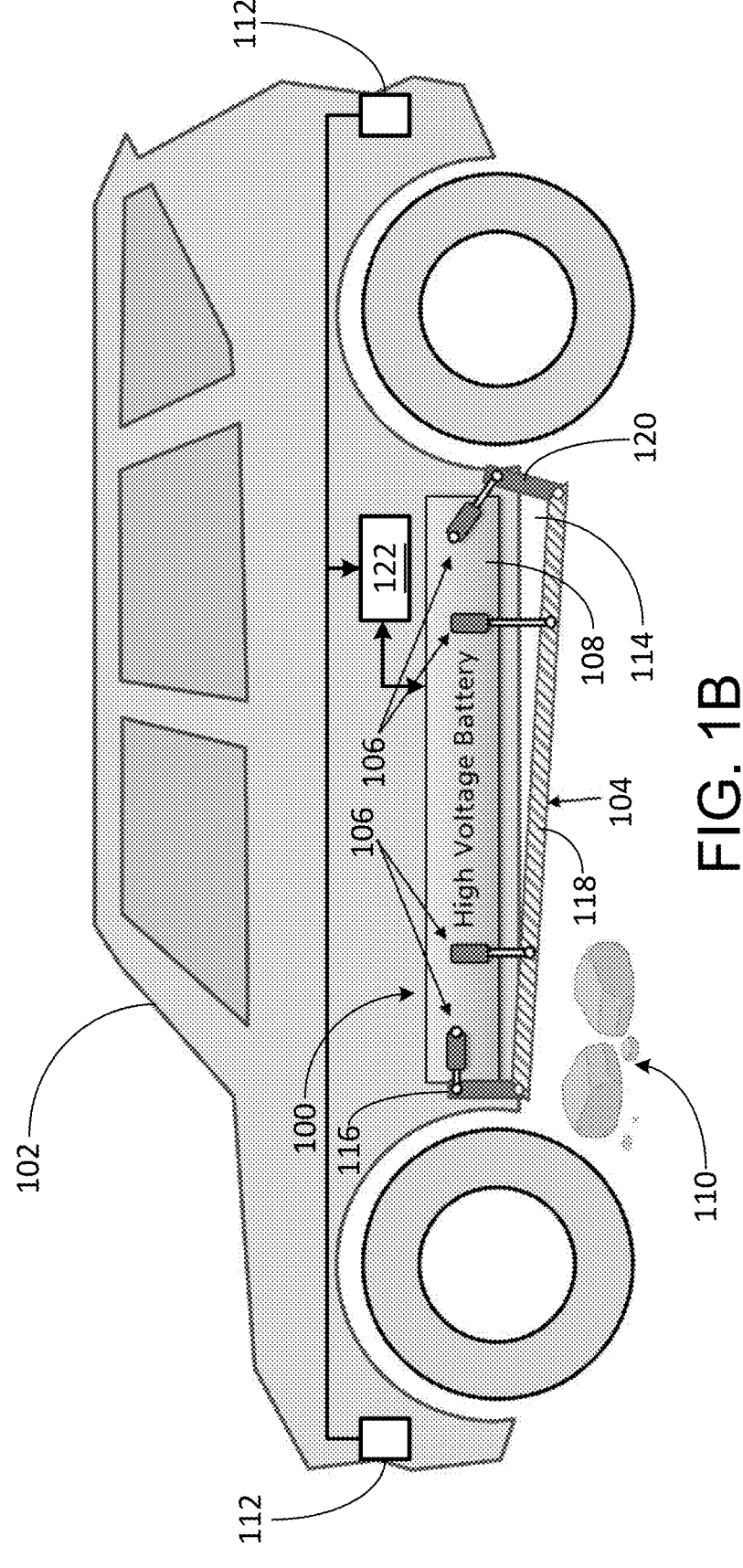
FIG. 1B illustrates a battery armor system, coupled to a vehicle, in a deployed ("ON") state, according to an exemplary embodiment of the present disclosure.

Referring now to FIGS. 1A-1B, a battery armor system 100, coupled to a vehicle 102, in a retracted ("OFF") state (FIG. 1A) and a deployed ("ON") state (FIG. 1B) is illustratively depicted, in accordance with an exemplary embodiment of the present disclosure.

According to an exemplary embodiment, battery armor system 100 may be an active battery armor system which may be configured to be deployed when a driving situation dictates a higher probability of floor-mounted battery 108 damage by utilizing various sensors to detect debris in the path of the vehicle 102, road roughness, vehicle 102 location, and/or other suitable situations in which there is a higher probability of floor-mounted battery 108 damage. According to an exemplary embodiment, the one or more sensors 112 may be configured to detect whether one or more conditions are met, wherein the skid plate 104 may be configured to be deployed upon the detection of the one or more conditions within an environment of the vehicle. The one or more conditions may comprise the presence of one or more objects/obstacles 110, the battery 108 exceeding a threshold temperature, the presence of a level of damage to one or more components of the battery armor system 100 exceeding a threshold level of damage, various driving surface types (e.g., an offroad surface type, an uneven surface type, etc.), and/or one or more other suitable conditions. According to an exemplary embodiment, the battery armor system 100 may be configured to be selectively deployed so as to preserve the all-electric range (AER) of the EV 102 when the battery armor is not deployed when additional protection is not needed.

According to an exemplary embodiment, the battery armor system 100 is configured to act as a mechanism for actively-controlled battery armor. The battery armor system 100 may comprise a moveable skid plate 104 and a system of actuators 106. The system of actuators 106 may be configured to move the moveable skid plate 104. The battery armor system 100 may comprise one or more computing devices 122. The one or more computing devices 122 may comprise a processor and/or memory. The memory may comprise one or more instructions that, when executed by the processor, cause the processor to perform one or more functions of the battery system armor 100.

The moveable skid plate 104 may be configured to act as shielding to protect an underbody-mounted battery 108. The moveable skid plate 104 may be positioned and configured to cover all or part of the underbody-mounted battery 108.

The moveable skid plate 104 may be configured to be extended and retracted based on a command from a control system. According to an exemplary embodiment, one or more of the one or more computing devices 122 may be configured to function as the control system.

The moveable skid plate 104 may be configured to be positioned in a retracted/stowed position (as shown, e.g., in FIG. 1A) and an expanded/lowered position (as shown, e.g., in FIG. 1B). According to an exemplary embodiment, when the moveable skid plate 104 is in the retracted/stowed position, it may be configured to remain flush with the underbody of the vehicle 102 to prevent any negative aerodynamic impact.

The moveable skid plate 104 may be configured to move vertically in relation to a driving surface to increase a spacing between a bottom of the battery pack 108 and one or more obstacles/objects 110 that may pass underneath the vehicle 102.

According to an exemplary embodiment, the system of actuators 106 may be configured to enable the moveable skid plate 104 to move downward, creating an airgap 114 between the bottom of the battery 108 and the moveable skid plate 104 (as shown, e.g., in FIG. 1B). This vertical spacing/ airgap 114 offers greater protection to the battery 108 in the case of high energy impacts with debris, terrain obstacles, and/or other items in the path of travel. According to an exemplary embodiment, the airgap 114 may be configured to the moveable skid plate to deform from underbody impacts without contacting the battery 108 or with greatly reduced contact to the battery 108. According to an exemplary embodiment, the airgap 114 enables energy absorption from underbody impacts with decreased damage to the battery 108.

According to an exemplary embodiment, the battery armor system 100 may comprise one or more sensors 112, coupled to the vehicle 102, configured to sense one or more road conditions in which there is a higher probability of floor-mounted battery 108 damage. The one or more road conditions may comprise the presence of one or more objects/obstacles 108 (e.g., debris, rocks, plants, speed bumps, speed humps, and/or other suitable objects/obstacles 108). The one or more road conditions may comprise a state of the driving surface (e.g., whether the driving surface comprises one or more uneven surfaces, one or more rough surfaces, whether the driving surface comprises an offroad driving surface, etc.). According to an exemplary embodiment, a battery 108 state (e.g., a state of charge (SOC) of the battery 108, a temperature of the battery, etc.) may be considered in determining whether the battery armor system 100 should be deployed.

According to an exemplary embodiment, the one or more sensors 112 may comprise one or more LiDAR sensors, one or more RADAR sensors, one or more cameras, and/or one or more other suitable sensor types. According to an exemplary embodiment, the one or more sensors 112 may be configured to monitor a condition of one or more components (e.g., the moveable skid plate 104) to determine whether the one or more components have been damaged. Damage to the one or more components may affect the all-electric range (AER) of the EV 102 and/or various noise, vibration, and/or harshness levels of the EV 102.

According to an exemplary embodiment, the moveable skid plate 104 may comprise one or more solid materials (e.g., steel, aluminum, plastic, composite, and/or other suitable solid materials) which have adequate impact resistance to prevent debris/objects 110 which impact the bottom of the vehicle 102 from deforming and/or causing penetration damage to the moveable skid plate 104. According to an exemplary embodiment, the moveable skid plate 104 may be comprised of a single piece and/or multiple pieces (e.g., pieces 116, 118, 120) coupled and/or joined together.

According to an exemplary embodiment, the one or more actuators 106 may comprise linear actuators. It is noted, however, that other actuator types may be incorporated while maintaining the spirit and functionality of the present disclosure. According to an exemplary embodiment, the one or more actuators 106 may comprise electric actuators, hydraulic actuators, and/or other suitable types of actuators. The one or more actuators 106 may be coupled to the vehicle 102 body, the battery/battery pack 108, and the moveable skid plate 104 such that the one or more actuators 106 may be configured to enable the moveable skid plate 104 to move from the retracted/stowed position (as shown, e.g., in FIG. 1A) into the expanded/lowered position (as shown, e.g., in FIG. 1B).

According to an exemplary embodiment, the one or more actuators may be configured to pivot as necessary to allow the moveable skid plate 104 to deploy downward. According to an exemplary embodiment, depending on the type of actuator used, the one or more actuators 106 may be configured to provide a dampening effect if the skid plate 104 is impacted by an object/obstacle 110, reducing damage to the skid plate itself.

Figures 2A, 2B:
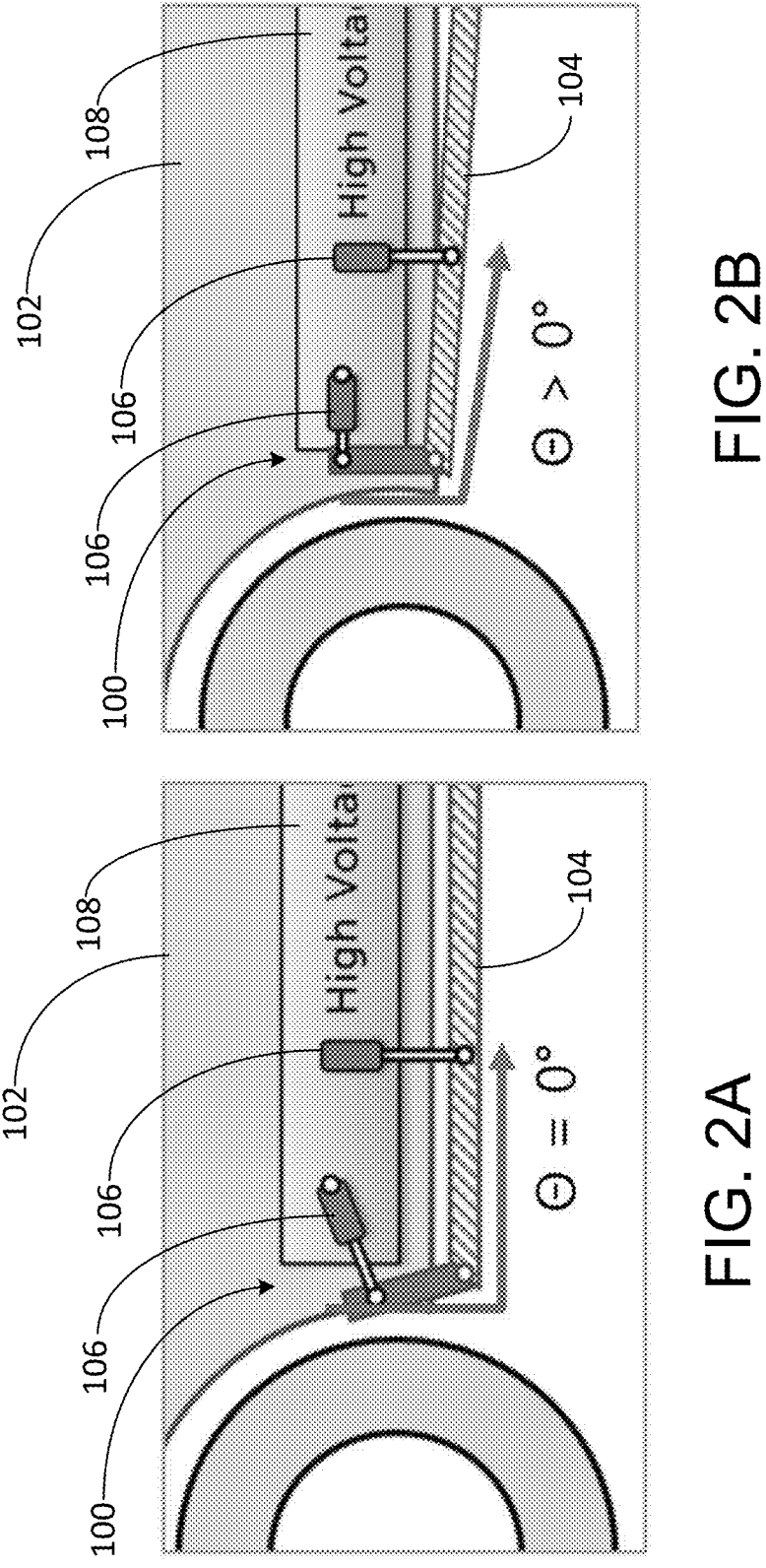
FIG. 2A illustrates a battery armor system, coupled to a vehicle, comprising a moveable skid plate in a vertical deployment angle, according to an exemplary embodiment of the present disclosure.
FIG. 2B illustrates a battery armor system, coupled to a vehicle, comprising a moveable skid plate in a non-vertical deployment angle, according to an exemplary embodiment of the present disclosure.
Figure 3:
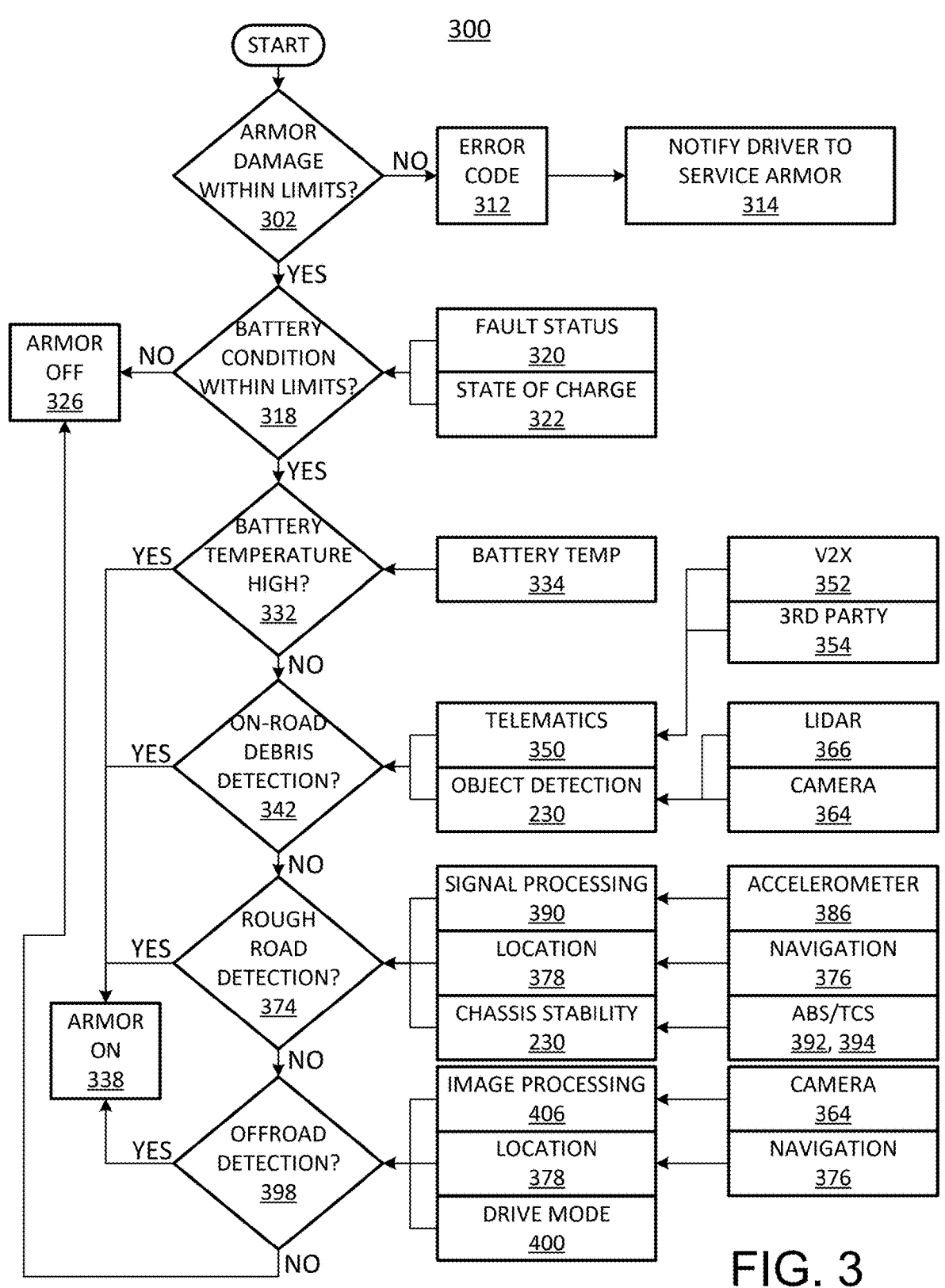
FIGS. 3-9 illustrate a logic flow diagram of control logic of a battery armor system, according to an exemplary embodiment of the present disclosure.
Figure 4:
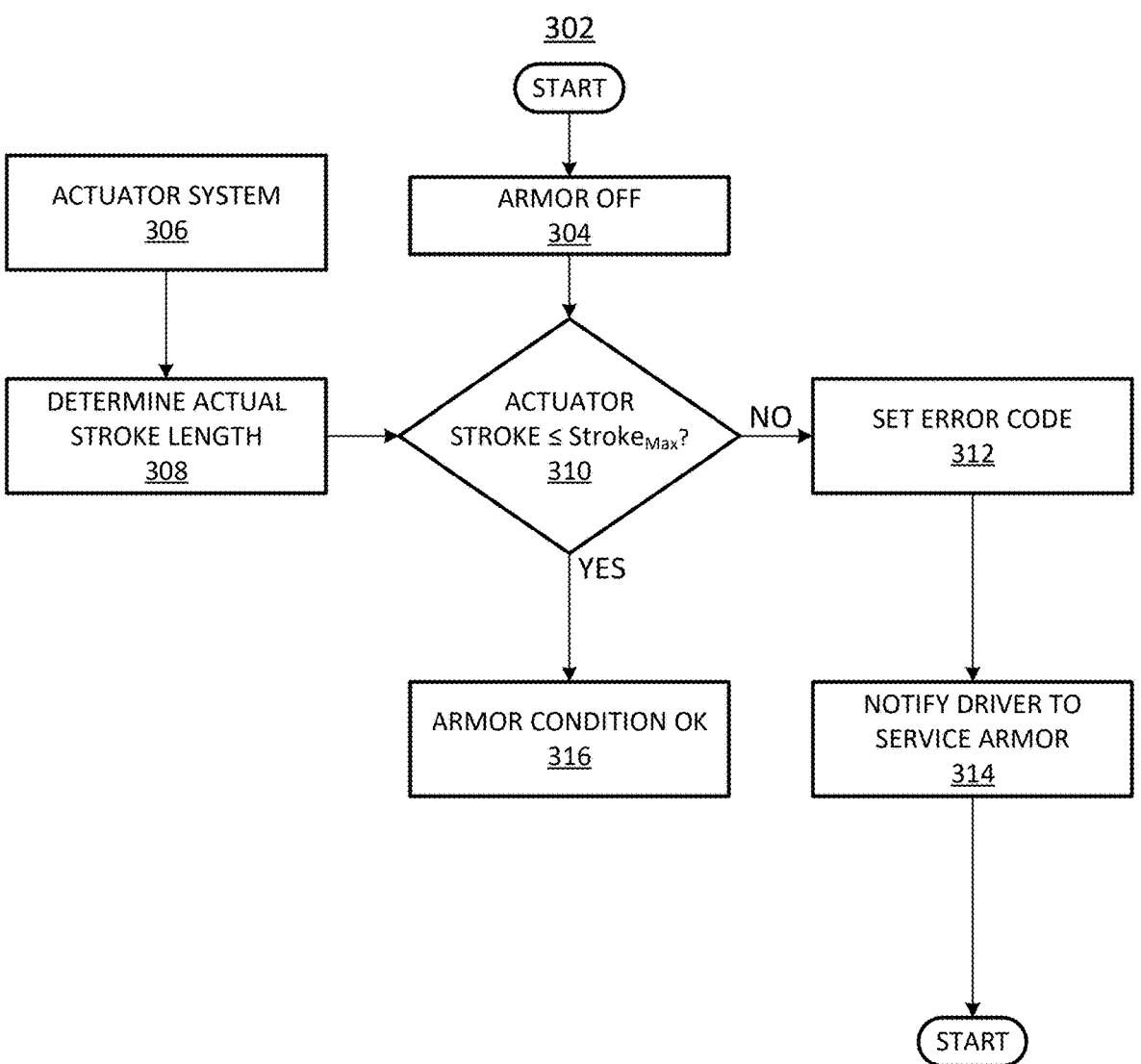
Figure 5:
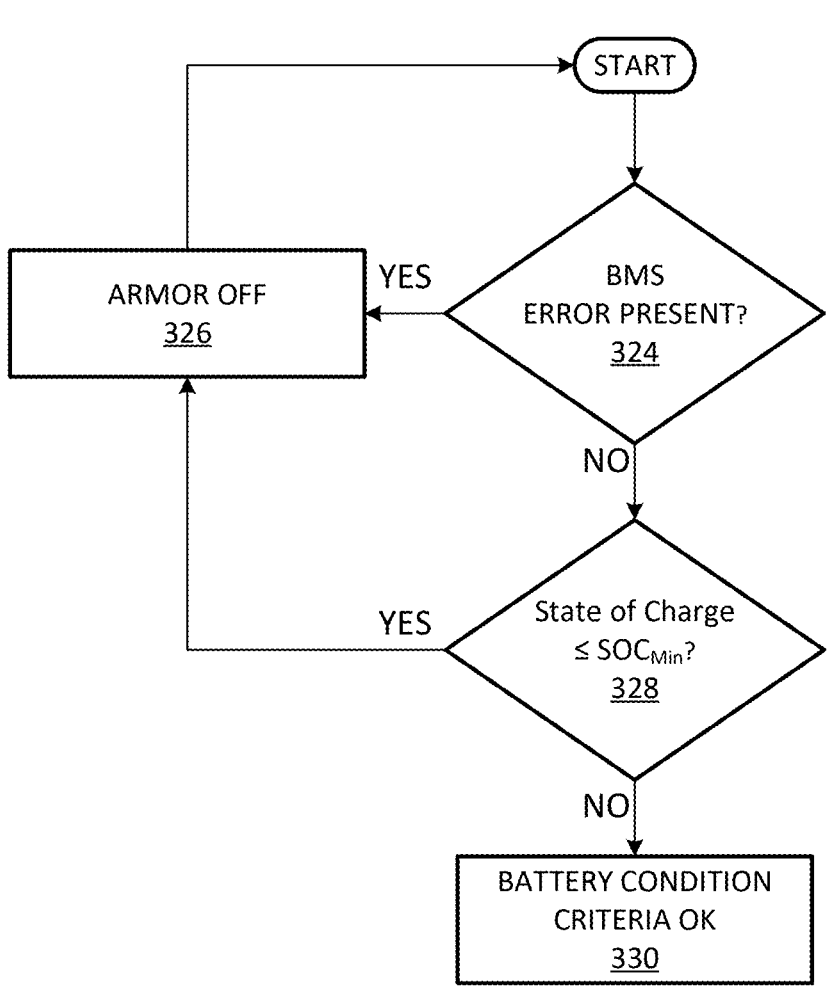
Figure 6:
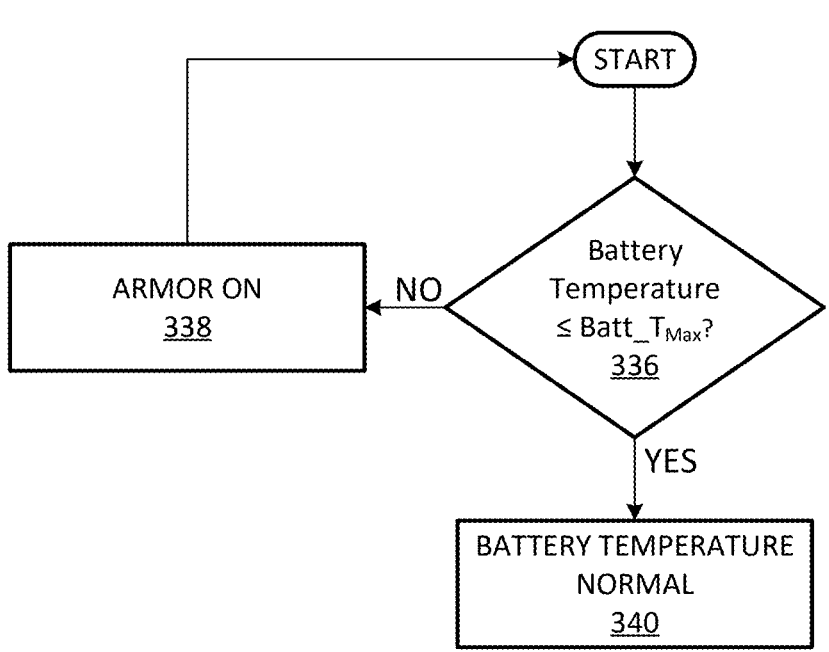
Figure 7:
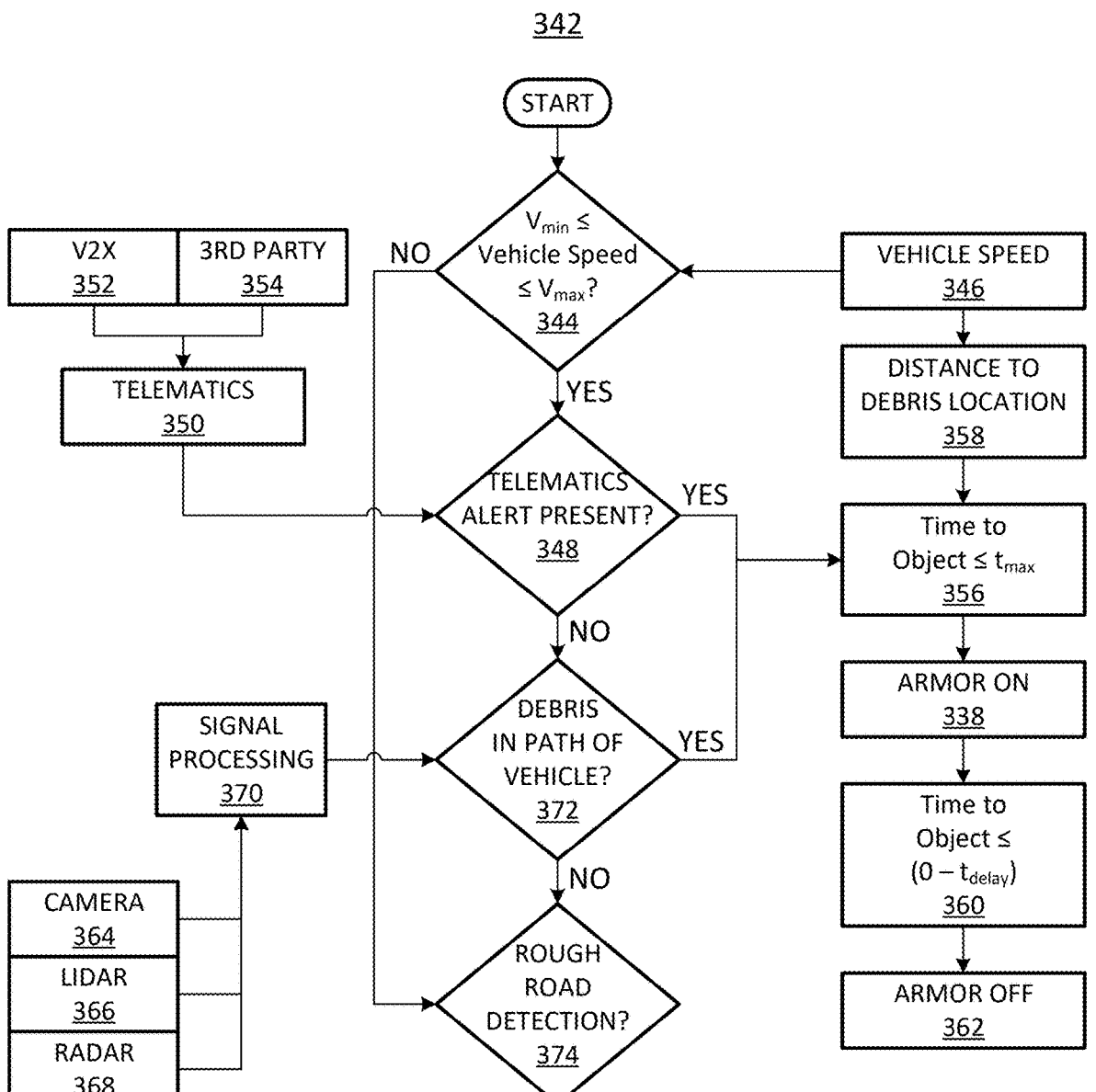
Figure 8:
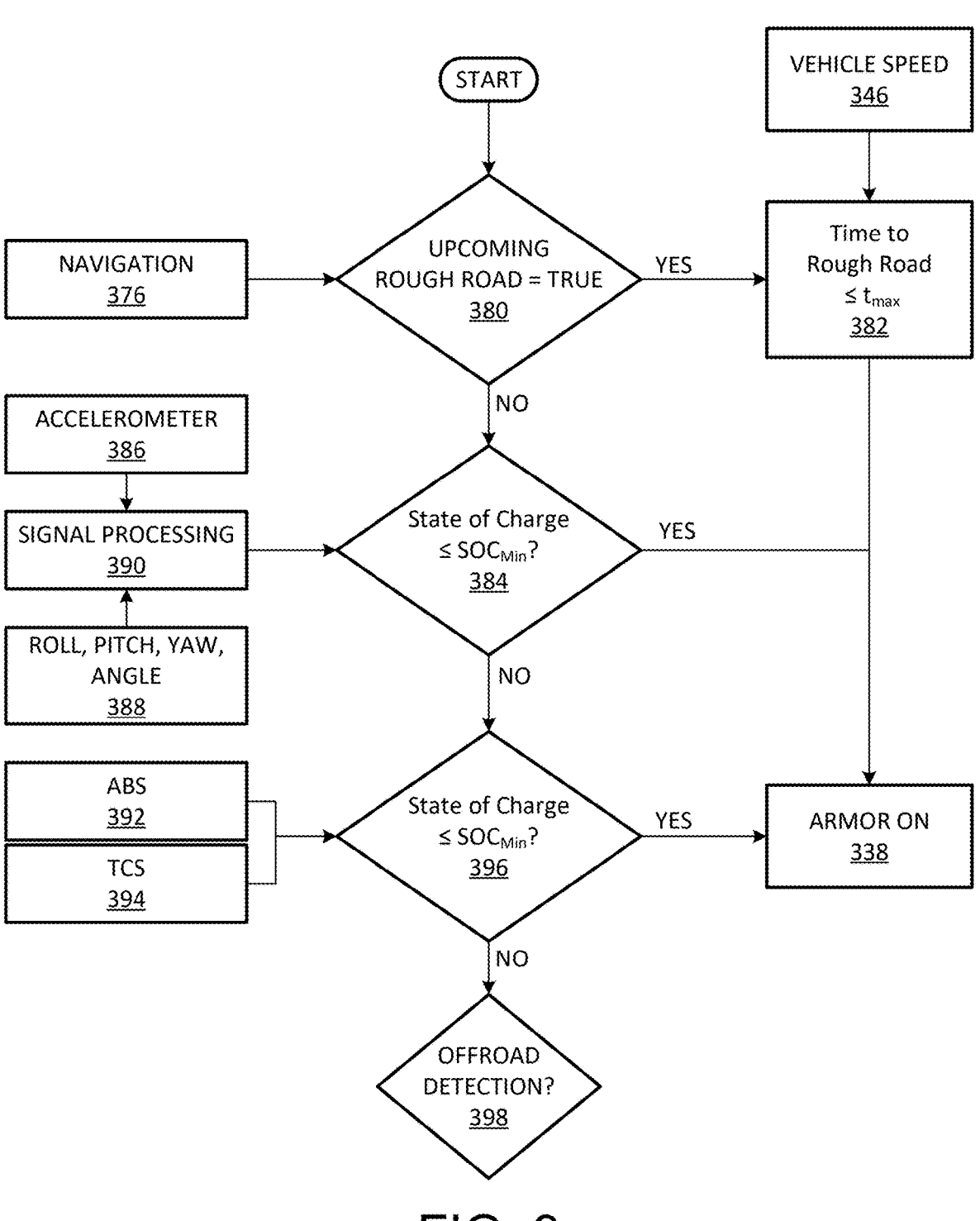
Figure 9:
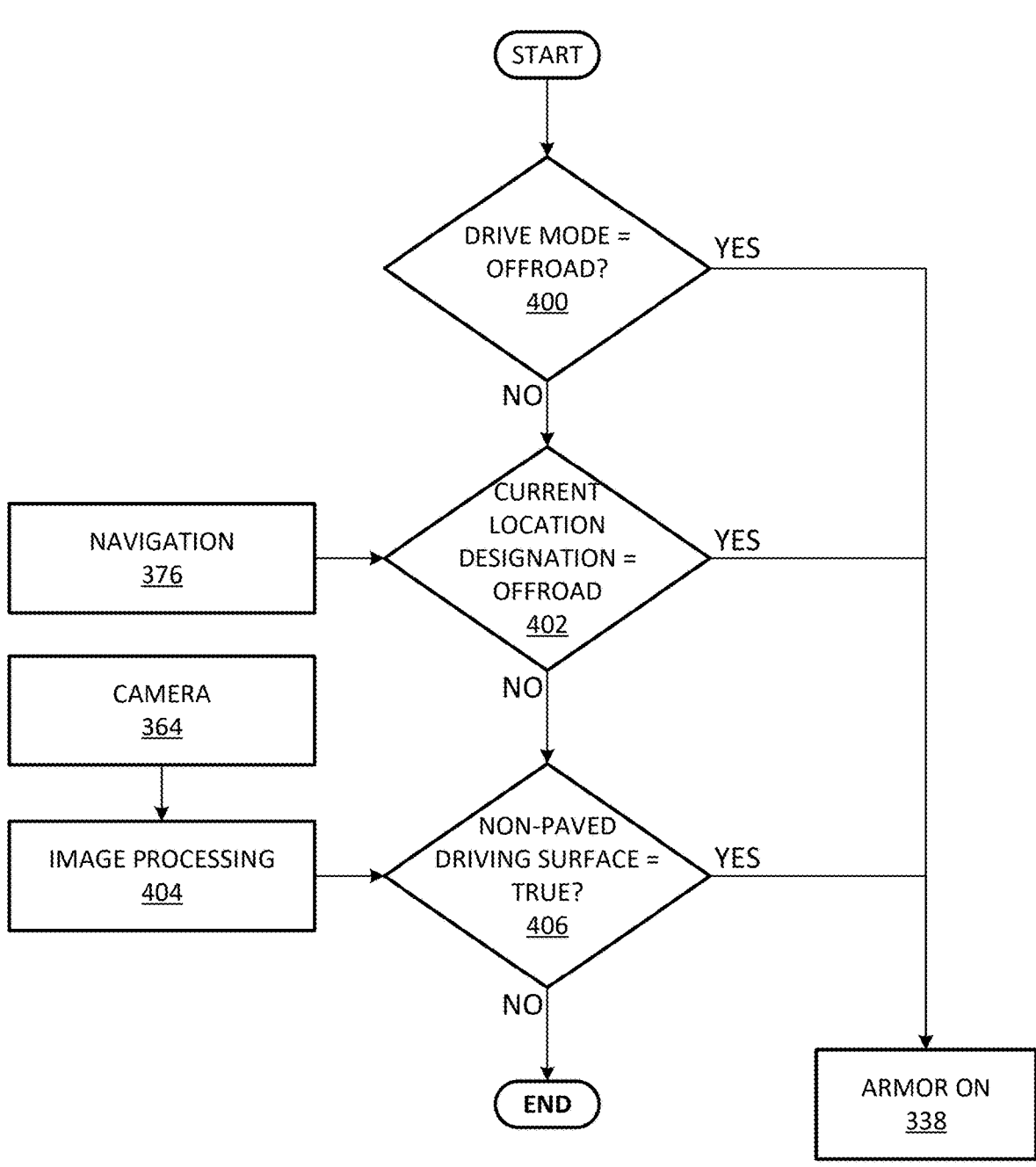

According to an exemplary embodiment, as shown, e.g., in FIGS. 2A-2B, the one or more actuators 106 may be configured to change an angle of deployment (Θ) of the skid plate 104 to provide the best protection given an upcoming situation. For example, as shown in FIG. 2A, the skid plate 104 may be deployed vertically (Θ=0°) or, as shown in FIG. 2B, the skid plate 104 may be deployed angled outward to the front or back of the battery pack (Θ>0°) to best deflect the upcoming object(s)/obstacle(s) 110.

Referring now to FIGS. 3-9, a logic flow diagram of control logic 300 of a battery armor system is illustratively depicted, in accordance with an exemplary embodiment of the present disclosure.

According to an exemplary embodiment, the control logic 300 may be configured to determine if the battery armor system may be deployed (e.g., by determining the battery status, the condition state of one or more components of the battery armor system, etc.) and when it should be deployed (e.g., when the vehicle is driving offroad, one rough road, over debris in path, etc.). To accomplish this, the various onboard sensors may be leveraged to generate a situational awareness for the battery armor system.

In order to protect the battery from severe impact by debris & objects in the path of travel, detection of such situations is necessary for timely deployment of the skid plate. By only deploying the skid plate when necessary, aerodynamic impacts can be minimized in order to maintain efficiency and preserve AER of the vehicle.

At 302, it is determined whether any armor damage (e.g., damage to one or more components of the battery armor system) is within one or more limits. Step 302 is further shown and described, e.g., in FIG. 4.

According to an exemplary embodiment, armor damage diagnostic logic may be used to monitor for changes in a retracted actuator position value in order to infer that the armor has been damaged.

At 304, armor is commanded off (e.g., the battery armor system is commanded to be in the retracted/stowed position) to ensure that one or more actuators have been fully retracted.

At 308, an actual stroke length is determined, for each of the one or more actuators, from the one or more actuators, at 306. At 310, for each of one or more actuators, an actual stroke length of an actuator is compared against a maximum stroke length value (Stroke$_{Max}$) to determine whether the actual stroke length is less than or equal to the maximum stroke length value to determine whether the actuator has fully retracted.

When the actual stroke less is not less than or equal to the maximum stroke length value, the armor may be damaged (e.g., dented, distorted, etc.) and an error code may be set, at 312. Damage to the armor may cause the armor (e.g., the skid plate) to get caught against the bottom of the battery. The vehicle driver, at 314, may then be notified via error code/message (e.g., via an instrument cluster) to have the armor serviced.

According to an exemplary embodiment, when the armor fails this diagnostic check (e.g., the armor is damaged), then the battery armor system may not be used until corrective action is taken.

When the actual stroke is less than or equal to the maximum stroke length, the armor, at 316, may then be considered to be OK (e.g., acceptable condition) and can be utilized for active protection of the battery. According to an exemplary embodiment, the battery armor system may be used, when it is in acceptable condition (i.e., the armor damage is within limits), as necessary based on an output of one or more subsequent control functions.

According to an exemplary embodiment, when all criteria of the armor damage control logic are met, then, at 318, it may be determined whether one or more battery conditions (e.g., error/fault status 320, SOC 322, pack temperature, etc.) are within limits such that the battery falls within the normal operating conditions. Step 318 is further shown and described, e.g., in FIG. 5.

According to an exemplary embodiment, at 324, a battery management system (BMS) may be used to determine whether any errors or diagnostic trouble codes (DTCs) are present.

When any errors or DTCs are present, then, at 326, the armor deployment will remain off. When there are no errors or DTCs present, then, at 328, the SOC of the battery is checked and compared to a SOC minimum value, SOC$_{Min}$, to determine whether the SOC is less than or equal to the SOC minimum value.

When the SOC is less than or equal to the SOC minimum value, then, at 326, the armor deployment may remain off. When the SOC is not less than or equal to the SOC minimum value, then, at 330, the battery condition may then be considered OK (e.g., an acceptable condition) and the battery condition is within limits.

According to an exemplary embodiment, when the battery condition is within limits, then, at 332, it is determined whether the battery temperature 334 is too high. According to an exemplary embodiment, a battery temperature monitor may be deployed to check to see if the armor should be deployed to increase airflow when the battery temperature exceeds a maximum temperature. According to an exemplary embodiment, the airflow may be increased across a bottom of the battery to lower pack temperature. Step 332 is further shown and described, e.g., in FIG. 6.

According to an exemplary embodiment, at 336, battery pack temperature 334 may be checked to determine whether the actual battery temperature is less than or equal to a maximum battery temperature, $Batt\_T_{max}$. According to an exemplary embodiment, when the actual battery temperature is not less than or equal to the maximum battery temperature, then, at 338, the armor is turned on into the extended/deployed position to allow for improved cooling of the battery. According to an exemplary embodiment, when the actual battery temperature is less than or equal to the maximum battery temperature, then, at 340, the batter temperature is labeled as normal.

According to an exemplary embodiment, when the battery temperature is determined to not be too high, then, at 342, it is determined whether any on-road debris has been detected. Step 342 is further shown and described, e.g., in FIG. 7.

According to an exemplary embodiment, on-road debris detection logic may be incorporated to check for the presence of one or more objects/obstacles (e.g., debris) within the path of vehicle travel which may cause damage to the battery if the debris were to impact the underside of the vehicle.

At 344, vehicle speed 346 may be checked to see if the actual vehicle speed is greater than or equal to a minimum vehicle speed ($V_{min}$) value and less than or equal to a maximum vehicle speed ($V_{max}$) value. When this condition is not met, then the on-road debris detection logic is ended and the control flow progresses to detect whether there is rough road within the path of the vehicle, at 374.

When the speed criteria of step 344 is met, then, at 348, a telematics system 350 may be checked to determine whether any alerts, which would indicate that debris is present in the path of the vehicle, are present. These alerts may comprise V2X alerts (e.g., V2V, V2I, etc) 352 and/or one or more alerts from a $3^{rd}$ Party Data Service 354 configured to monitor for the presence of on-road debris.

According to an exemplary embodiment, when an alert is present, then, at 356, a time to the object (i.e., a time till the vehicle reaches the object) may be calculated based on one or more factors such as, e.g., current vehicle speed 346, a distance to the object 358, and/or other suitable measurements.

According to an exemplary embodiment, once the time to the object is less than or equal to a maximum time $t_{Max}$, then the armor, at 338, is turned on/deployed to protect the battery. After the vehicle passes the object and a delay criteria, $t_{delay}$, at 360, is met, the armor may be turned off after, at 362.

According to an exemplary embodiment, when there are no telematics alerts present, then sensor data (from, e.g., one or more cameras 364, LiDAR sensors 366, RADAR sensors 368, and/or other suitable sensors) is processed, at 370, via sensor fusion to determine, at 372, whether any debris is detected in the path of the vehicle.

When debris is detected, then, at 356, a time to the object may be calculated. When debris is not detected, then the on-road debris detection logic is ended and the control flow progresses to detect whether there is rough road within the path of the vehicle, at 374. Step 374 is further shown and described, e.g., in FIG. 8.

According to an exemplary embodiment, rough-road detection logic may be incorporated which may monitor both the vehicle's predicted path as well as the current road condition on which the vehicle is traveling to determine whether the level of road/surface distress is great enough to justify deploying the armor.

According to an exemplary embodiment, navigation system data 376 may be used to determine the vehicle's location

378. The vehicle's location 378 may be compared to navigation system data 376 to determine, at 380, whether the predicted vehicle path will encounter a rough road based on the navigation system data.

When a rough road will be encountered on the vehicle's predicted path, then, at 338, the armor may be turned on/deployed when a time to rough road (i.e., a time until the vehicle reaches the rough road) is less than a maximum time, $t_{Max}$, at 382. According to an exemplary embodiment, the time to rough road may be determined based on the vehicle's speed 346.

According to an exemplary embodiment, when there is no known upcoming rough road, then the condition of the road surface is monitored to classify the level of roughness/distress in order to determine whether the road has a road distress classification, at 384. According to an exemplary embodiment, an accelerometer 386 and roll, pitch, and/or yaw angle data 388 may be analyzed, according to signal processing, at 390, to classify the level of distress of the road surface.

According to an exemplary embodiment, when the road has a positive road distress classification, then, at 338, the armor may be turned on/deployed.

According to an exemplary embodiment, when the road surface is not distressed (i.e., the road does not have a road distress classification), then the antilock braking system (ABS) 392 and a traction control system (TCS) 394 may be monitored to determine, at 396, whether the ABS and/or TCS are active in order to deploy the armor in the case of the vehicle sliding/skidding. According to an exemplary embodiment, when the ABS 392 and/or TCS 394 are active, then, at 338, the armor may be turned on/deployed.

According to an exemplary embodiment, when none of the Rough-Road criteria are met, then it is determined, at 398, whether an offroad driving surface has been detected. Step 398 is further shown and described, e.g., in FIG. 9.

According to an exemplary embodiment, offroad detection logic may be incorporated which monitors both the vehicle's drive mode, location, and road surface via image processing to make determine whether the vehicle is traveling offroad.

According to an exemplary embodiment, a current drive mode may be monitored to determine, at 400, whether the current drive mode is an offroad drive mode.

When the current drive mode is an offroad drive mode, then, at 338, the armor may be turned on/deployed.

According to an exemplary embodiment, when the current drive mode is not an offroad drive mode, then, at 402, is may be determined whether the current location 378 of the vehicle has an offroad designation. According to an exemplary embodiment, a navigation system 376 (e.g., a GPS location system and/or other suitable type of navigation system) may be used to determine a location 378 of the vehicle. The location 378 of the vehicle may be compared against navigation data to determine, at 402, whether the vehicle is traveling on a road designated as offroad.

When the current location 378 of the vehicle has an offroad designation, then, at 338, the armor may be turned on/deployed.

When the current location 378 of the vehicle does not have an offroad designation, then, at 404, one or more sensors (e.g., one or more cameras 364 and/or other suitable types of sensor) may be used to classify the road surface such that image processing, at 404, of one or more images may be used to determine, at 406, whether the driving surface is a non-paved driving surface.

According to an exemplary embodiment, when the driving surface is a non-paved driving surface, then, at 338, the armor may be turned on/deployed.

According to an exemplary embodiment, when the driving surface is not a non-paved driving surface, then, at 326, the armor deployment may remain off.

Figure 10:
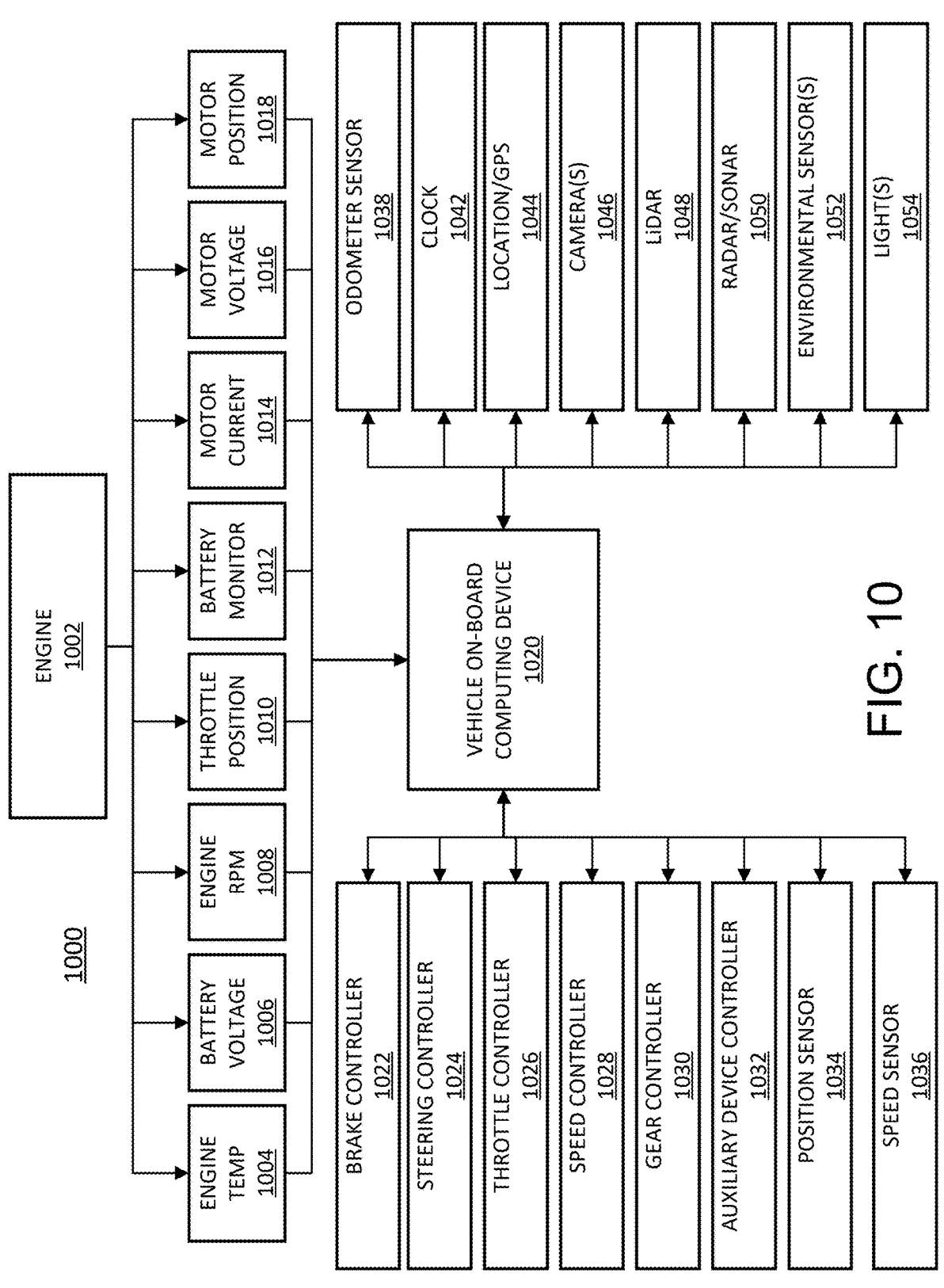
FIG. 10 illustrates an example architecture of a vehicle, according to an exemplary embodiment of the present disclosure.

Referring now to FIG. 10, an example vehicle system architecture 1000 for a vehicle is provided, in accordance with an exemplary embodiment of the present disclosure. The following discussion of vehicle system architecture 1000 is sufficient for understanding one or more components of vehicle 102.

As shown in FIG. 10, the vehicle system architecture 1000 may comprise an engine, motor or propulsive device 1002 and various sensors 1004-1018 for measuring various parameters of the vehicle system architecture 1000. In gas-powered or hybrid vehicles having a fuel-powered engine, the sensors 1004-1018 may comprise, for example, an engine temperature sensor 1004, a battery voltage sensor 1006, an engine Rotations Per Minute (RPM) sensor 1008, and/or a throttle position sensor 1010. If the vehicle is an electric or hybrid vehicle, then the vehicle may comprise an electric motor, and accordingly may comprise sensors such as a battery monitoring system 1012 (to measure current, voltage and/or temperature of the battery), motor current 1014 and voltage 1016 sensors, and motor position sensors such as resolvers and encoders 1018.

Operational parameter sensors that are common to both types of vehicles may comprise, for example: a position sensor 1034 such as an accelerometer, gyroscope and/or inertial measurement unit; a speed sensor 1036; and/or an odometer sensor 1038. The vehicle system architecture 1000 also may comprise a clock 1042 that the system uses to determine vehicle time and/or date during operation. The clock 1042 may be encoded into the vehicle on-board computing device 1020, it may be a separate device, or multiple clocks may be available.

The vehicle system architecture 1000 also may comprise various sensors that operate to gather information about the environment in which the vehicle is traveling. These sensors may comprise, for example: a location sensor 1044 (for example, a Global Positioning System (GPS) device); object detection sensors such as one or more cameras 1046; a LiDAR sensor system 1048; and/or a RADAR and/or a sonar system 1050. The sensors also may comprise environmental sensors 1052 such as, e.g., a humidity sensor, a precipitation sensor, a light sensor, and/or ambient temperature sensor. The object detection sensors may be configured to enable the vehicle system architecture 1000 to detect objects that are within a given distance range of the vehicle in any direction, while the environmental sensors 1052 may be configured to collect data about environmental conditions within the vehicle's area of travel. According to an exemplary embodiment, the vehicle system architecture 1000 may comprise one or more lights 1054 (e.g., headlights, flood lights, flashlights, etc.).

During operations, information may be communicated from the sensors to an on-board computing device 1020 (e.g., computing device 122, computing device 1100). The on-board computing device 1020 may be configured to analyze the data captured by the sensors and/or data received from data providers and may be configured to optionally control operations of the vehicle system architecture 1000 based on results of the analysis. For example, the on-board computing device 1020 may be configured to control: braking via a brake controller 1022; direction via a steering controller 1024; speed and acceleration via a throttle controller 1026 (in a gas-powered vehicle) or a motor speed controller 1028 (such as a current level controller in an electric vehicle); a differential gear controller 1030 (in vehicles with transmissions); and/or other controllers. The brake controller 1022 may comprise a pedal effort sensor, pedal effort sensor, and/or simulator temperature sensor, as described herein.

Geographic location information may be communicated from the location sensor 1044 to the on-board computing device 1020, which may then access a map of the environment that corresponds to the location information to determine known fixed features of the environment such as streets, buildings, stop signs and/or stop/go signals. Captured images from the cameras 1046 and/or object detection information captured from sensors such as LiDAR 1048 may be communicated from those sensors to the on-board computing device 1020. The object detection information and/or captured images may be processed by the on-board computing device 320 to detect objects in proximity to the vehicle. Any known or to be known technique for making an object detection based on sensor data and/or captured images may be used in the embodiments disclosed in this document.

Figure 11:
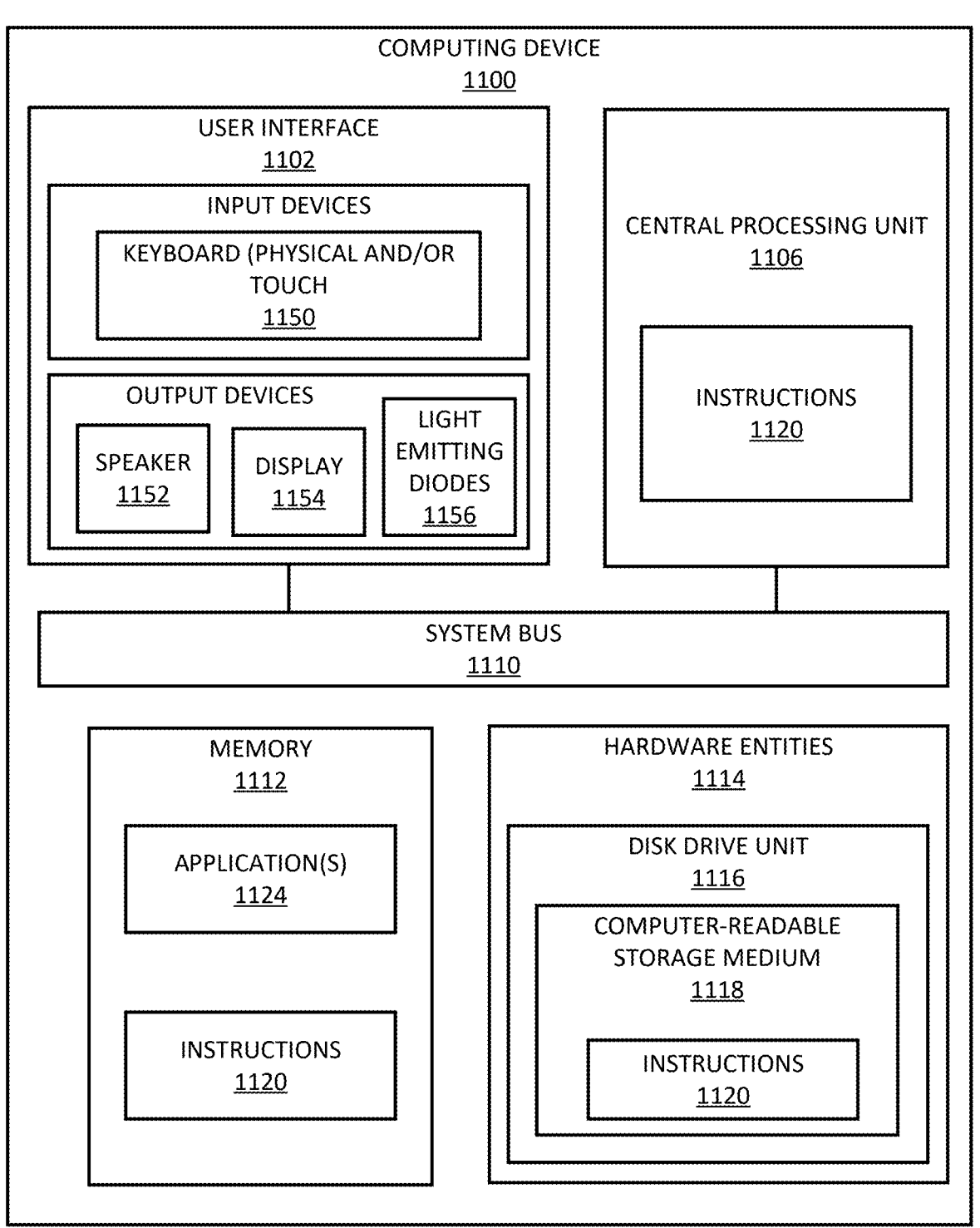
FIG. 11 illustrates example elements of a computing device, according to an exemplary embodiment of the present disclosure.

Referring now to FIG. 11, an illustration of an example architecture for a computing device 1100 is provided. According to an exemplary embodiment, one or more functions of the present disclosure may be implemented by a computing device such as, e.g., computing device 1100 or a computing device similar to computing device 1100. Computing device 1100 may be a quantum computer, a classical computer, and/or have one or more components configured to perform one or more quantum and/or classical computing functions. Computing device 122 may be an example of computing device 1100 and/or may comprise one or more components of computing device 1100.

The hardware architecture of FIG. 11 represents one example implementation of a representative computing device configured to implement at least a portion of the systems (e.g., battery armor system 100) and method(s)/control logic(s) (e.g., control logic 300) described herein.

Some or all components of the computing device 1100 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 11, the computing device 1100 may comprise a user interface 1102 (e.g., a graphical user interface), a Central Processing Unit ("CPU") 1106, a system bus 1110, a memory 1112 connected to and accessible by other portions of computing device 1100 through system bus 1110, and hardware entities 1114 connected to system bus 1110. The user interface may comprise input devices and output devices, which may be configured to facilitate user-software interactions for controlling operations of the computing device 1100. The input devices may comprise, but are not limited to, a physical and/or touch keyboard 1140. The input devices may be connected to the computing device 1100 via a wired or wireless connection (e.g., a Bluetooth® connection). The output devices may comprise, but are not limited to, a speaker 1142, a display 1144, and/or light emitting diodes 1146.

At least some of the hardware entities 1114 may be configured to perform actions involving access to and use of memory 1112, which may be a Random Access Memory (RAM), a disk driver and/or a Compact Disc Read Only Memory (CD-ROM), among other suitable memory types. Hardware entities 1114 may comprise a disk drive unit 1116 comprising a computer-readable storage medium 1118 on which may be stored one or more sets of instructions 1120 (e.g., programming instructions such as, but not limited to, software code) configured to implement one or more of the methodologies, procedures, or functions described herein. The instructions 1120 may also reside, completely or at least partially, within the memory 1112 and/or within the CPU 1106 during execution thereof by the computing device 1100.

The memory 1112 and the CPU 1106 may also constitute machine-readable media. The term "machine-readable media", as used here, refers to a single medium or multiple media (e.g., a centralized or distributed database, and/or associated caches and servers) that store the one or more sets of instructions 1120. The term "machine-readable media", as used here, also refers to any medium that is capable of storing, encoding, or carrying a set of instructions 1120 for execution by the computing device 1100 and that cause the computing device 1100 to perform any one or more of the methodologies of the present disclosure.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A battery armor system, comprising:
   one or more sensors configured to detect whether one or more conditions within an environment of a vehicle are met;
   a moveable skid plate, positioned under a vehicle battery, configured to move between a retracted position and a deployed position; and
   one or more actuators configured to move the moveable skid plate between the retracted position and the deployed position,
   wherein:
      in the deployed position, an airgap is formed between the moveable skid plate and the vehicle battery, and
      the one or more actuators are configured to move the moveable skid plate into the deployed position upon detection that the one or more conditions are met.

2. The battery armor system of claim 1, wherein the one or more conditions comprise one or more conditions selected from the following:
   debris in a path of the vehicle;
   an uneven driving surface;
   an offroad driving surface;
   a temperature of the battery exceeding a threshold temperature; and
   a level of damage to one or more components of the battery armor exceeding a threshold level of damage.

3. The battery armor system of claim 1, further comprising a computing device comprising a processor and a memory.

4. The battery armor system of claim 3, wherein the memory comprises instructions that, when executed by the processor, are configured to cause the processor to cause the one or more actuators to move the skid plate.

5. The battery armor system of claim 4, wherein,
   when the skid plate is in the deployed position, the instructions, when executed by the processor, are further configured to cause the processor to cause the actuators to move the skid plate into the retracted position when the one or more conditions are no longer met.

6. The battery armor system of claim 1, wherein the one or more actuators are configured to adjust a deployment angle of the skid plate.

7. The battery armor system of claim 1, wherein the moveable skid plate is configured to be flush with an underbody of the vehicle when in the retracted position.

8. The battery armor system of claim 1, wherein the one or more sensors comprise one or more sensors selected from the following: one or more cameras; one or more LiDAR sensors; and one or more RADAR sensors.

9. The battery armor system of claim 1, further comprising the vehicle.

10. The battery armor system of claim 1, wherein the vehicle comprises an electric vehicle.

11. A method of selectively deploying a battery armor system, the method comprising:

using a computing device comprising a processor and a memory, determining, based on data from one or more sensors of a battery armor system, whether one or more conditions are met within an environment of a vehicle, wherein the battery armor system comprises:

one or more sensors configured to detect whether the one or more conditions are met;

a moveable skid plate, positioned under a vehicle battery, configured to move between a retracted position and a deployed position; and one or more actuators configured to move the moveable skid plate between the retracted position and the deployed position, wherein:

in the deployed position, an airgap is formed between the moveable skid plate and the vehicle battery, and the one or more actuators are configured to move the moveable skid plate into the deployed position upon detection that the one or more conditions are met;

deploying, using the one or more actuators, the skid plate into the deployed position when the one or more conditions are met; and when the skid plate is in the deployed position, retracting, using the one or more actuators, the skid plate into the retracted position when the one or more conditions are no longer met.

12. The method of claim 11, wherein:

the determining whether the one or more conditions are met comprises determining whether a level of damage to one or more components of the battery armor system has been exceeded, and the one or more conditions are met when the level of damage to the one or more components of the battery armor system has been exceeded.

13. The method of claim 11, wherein:

the determining whether the one or more conditions are met comprises determining whether a temperature of the vehicle battery exceeds a threshold temperature, and the one or more conditions are met when the temperature of the vehicle battery exceeds the threshold temperature.

14. The method of claim 11, wherein:

the determining whether the one or more conditions are met comprises determining whether debris is present within a path of the vehicle, and the one or more conditions are met when the debris is found within the path of the vehicle.

15. The method of claim 11, wherein:

the determining whether the one or more conditions are met comprises determining whether a driving surface is a rough road driving surface, and the one or more conditions are met when the driving surface is a rough road driving surface.

16. The method of claim 11, wherein:

the determining whether the one or more conditions are met comprises determining whether a driving surface is an offroad driving surface, and the one or more conditions are met when the driving surface is an offroad driving surface.

17. The method of claim 11, further comprising adjusting, using the one or more actuators, a deployment angle of the skid plate.

18. The method of claim 11, wherein the one or more sensors comprise one or more sensors selected from the following: one or more cameras; one or more LiDAR sensors; and one or more RADAR sensors.

19. The method of claim 11, wherein the battery armor system comprises the vehicle.

20. The method of claim 19, wherein the vehicle comprises an electric vehicle.

\* \* \* \* \*